US008644992B2

(12) United States Patent
Suel, II

(10) Patent No.: US 8,644,992 B2
(45) Date of Patent: Feb. 4, 2014

(54) METHOD TO IMPROVE WASHER MOTOR EFFICIENCY AND PERFORMANCE

(75) Inventor: Richard Dean Suel, II, Louisville, KY (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 13/101,259

(22) Filed: May 5, 2011

(65) Prior Publication Data

US 2012/0065745 A1    Mar. 15, 2012

(51) Int. Cl.
G01B 13/00 (2006.01)
G01B 15/00 (2006.01)
G05D 23/00 (2006.01)

(52) U.S. Cl.
USPC ............... 700/275; 700/40; 700/139; 700/68; 700/297; 700/299; 318/400.01; 318/400.02; 8/158; 8/159; 68/12.16; 68/12.23; 68/140

(58) Field of Classification Search
USPC ..................... 700/40, 139, 68, 297–300, 275; 318/400.01, 400.02; 8/158–159; 68/12.16, 12.23, 140
See application file for complete search history.

(56) References Cited

U.S. PATENT DOCUMENTS

| 4,999,561 | A | * | 3/1991 | Kaga et al. ..................... 318/812 |
| 5,032,771 | A | | 7/1991 | Kerkman et al. |
| 5,914,582 | A | * | 6/1999 | Takamoto et al. ............. 318/801 |
| 6,121,768 | A | * | 9/2000 | Taurand ..................... 324/117 R |
| 7,064,517 | B2 | * | 6/2006 | Kiuchi et al. ................. 318/802 |
| 7,336,514 | B2 | * | 2/2008 | Amarillas et al. ............. 363/124 |
| 7,468,595 | B2 | * | 12/2008 | Lee et al. ....................... 318/802 |
| 7,958,584 | B2 | * | 6/2011 | Suel et al. ......................... 8/158 |
| 8,174,222 | B2 | * | 5/2012 | Patel et al. ................. 318/400.32 |
| 8,390,229 | B2 | * | 3/2013 | Suel, II ......................... 318/445 |
| 2003/0020431 | A1 | * | 1/2003 | Kiuchi et al. ................. 318/779 |
| 2005/0146306 | A1 | * | 7/2005 | Ha et al. ....................... 318/807 |

(Continued)

FOREIGN PATENT DOCUMENTS

| JP | 2003 219698 | * | 7/2003 | .............. H02P 21/00 |
| JP | 2004 048886 | * | 2/2004 | .............. H02P 21/00 |
| JP | 2010 268551 | * | 11/2010 | .............. H02P 27/06 |

OTHER PUBLICATIONS

Moussaoui et al, "An Open Loop Space Vector PWM Control for CSI-fed Field-Oriented Induction Motor Drive with Improved Performances and Reduced Pulsating Torque", 2005, pp. 7.*

(Continued)

Primary Examiner — Kavita Padmanabhan
Assistant Examiner — Olvin Lopez Alvarez
(74) Attorney, Agent, or Firm — Dority & Manning P.A.

(57) ABSTRACT

The present subject matter relates to methods and apparatus for controlling operation of a washing machine motor. Different control algorithms may be used during different time periods of operation of the motor where each algorithm is configured to provide different operating characteristics of the motor based on the needs of the washing machine system. The method and apparatus both provide for changing from one motor control algorithm to another algorithm while the motor is spinning. For certain type motors, a time period may be established between operation of the motor under a first or second control algorithms where no energy is supplied to the motor but the motor is permitted to continue to spin. During this period of time for these type motors, magnetic fields in the motor are permitted to subside prior to application of the second control algorithm.

9 Claims, 4 Drawing Sheets

(56) References Cited

U.S. PATENT DOCUMENTS

2006/0197491 A1* 9/2006 Nojima .................. 318/801
2007/0108935 A1* 5/2007 Iotti ..................... 318/772
2008/0030162 A1* 2/2008 Salomaki et al. ............. 318/721
2010/0148710 A1* 6/2010 Lim et al. ................ 318/400.11
2010/0164428 A1* 7/2010 Xu et al. .................. 318/767
2010/0283414 A1* 11/2010 Jun et al. ................. 318/400.02
2011/0033173 A1* 2/2011 Bonner et al. ................ 388/805
2012/0091941 A1* 4/2012 Hong ...................... 318/766
2012/0111065 A1* 5/2012 Suel et al. ................. 68/12.16

OTHER PUBLICATIONS

Freescale, "Sensorless AC motor Control", Nov. 11, 2008, pp. 3.*
Freescale, "Industrial Motor Control Part 2", Jul. 2009, pp. 26.*

* cited by examiner

METHOD TO IMPROVE WASHER MOTOR EFFICIENCY AND PERFORMANCE

FIELD OF THE INVENTION

The present subject matter relates to electric motor control. More particularly, the present subject matter relates to washing machine motor control using selectable control algorithms.

BACKGROUND OF THE INVENTION

There are many algorithms available to control operation of electric motors. Field-Oriented Control (FOC) is one such algorithm that provides an excellent control methodology for driving a motor very efficiently and it provides great dynamic load torque response. However, at high speeds FOC may be less powerful if current shunts are used to measure phase currents as some power is lost due to max duty cycle limitations associated with current sampling. Voltage-frequency (V/Hz) control is another available control algorithm. V/Hz control is advantageous under certain circumstances as it does not monitor phase currents and thus power is not limited at high speeds, thereby allowing more power delivery.

In a washing machine environment, a desire to establish efficient operation suggests that it is important to keep currents and temperatures low during agitate cycles but recognizes that the use of high power is necessary for reaching top speeds. Normally these different operational modes are mutually exclusive.

There are parameters associated with many different devices that represent options of particular importance to consumers that are generally referred to as CTQs (critical to quality). In view of theses concerns with prior washing machine control systems, it would be advantageous to develop methodologies for operating washing machines that allows a washing machine motor to deliver multiple CTQ's including high efficiency and high power despite their generally mutually exclusive nature.

BRIEF DESCRIPTION OF THE INVENTION

Aspects and advantages of the invention will be set forth in part in the following description, or may be obvious from the description, or may be learned through practice of the invention.

The present subject matter relates to a method for providing washing machine motor control. It should be appreciated that while the present subject matter is described in relation to a washing machine motor control, such controls may be equally used in other types of washers including residential and commercial clothing washers or other types of washers.

The method comprises controlling operation of a washing machine motor using a first control algorithm configured to provide first motor control operating characteristics and controlling operation of the washer motor using a second control algorithm configured to provide second motor control operating characteristics. Operational control of the motor is shifted from the first algorithm to the second algorithm while the motor is spinning. The method further provides for transitioning from the first control to the second control algorithm during operation with no noticeable effect to the user. In this manner the motor may continue to spin during the transition period. When AC induction motors are employed, the method permits rotating magnetic fields in the motor time to subside. In instances where permanent magnet synchronous motors (PMSM) or Brushless DC (BLDC) motors, a time delay between transitions may not be required.

In selected embodiments, the method employs a field-oriented control (FOC) algorithm as the first control algorithm and a voltage-frequency (V/Hz) control algorithm as the second control algorithm. In other selected embodiments, the method employs a voltage-frequency (V/Hz) control algorithm as the first control algorithm and a field-oriented control (FOC) algorithm as the second control algorithm. In yet further embodiments, the method employs one of a braking algorithm and an open-loop algorithm as the second control algorithm. In certain embodiments, the method provides a soft-start of the motor as a part of at least one of the first and second control algorithms to provide a smooth transition. Certain selected embodiments may provide for more than two different control algorithms, each providing different motor operating characteristics.

The present subject matter also relates to a washing machine motor control. In such embodiments a controller is provided and is configured to provide operational control of a washing machine motor using first and second control algorithms, each algorithm providing different motor operating characteristics. The controller is further configured to cause operation to shift from the first algorithm to the second algorithm while the motor is spinning. Some embodiments employing an AC induction motor may also provide a timer that is configured to delay application of the second control algorithm for a predetermined transition time following discontinuance of operation using the first control algorithm (this is true for AC induction motors, but not synchronous motors such as Brushless DC (BLDC) or Permanent Magnet Synchronous Motor (PMSM) motors).

In selected embodiments, the first or second control algorithm may correspond to a field-oriented control (FOC) algorithm while the second or first control algorithm may correspond to a voltage-frequency (V/Hz) control algorithm. In some embodiments, the second control algorithm may be one of a braking algorithm and an open-loop algorithm. In particular embodiments, at least one of the first and second control algorithms may be configured to provide a soft-start of the motor. In certain particular embodiments, the controller may correspond to one or more of a computer, a processor, a microprocessor, an ASIC device, and a printed circuit board.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
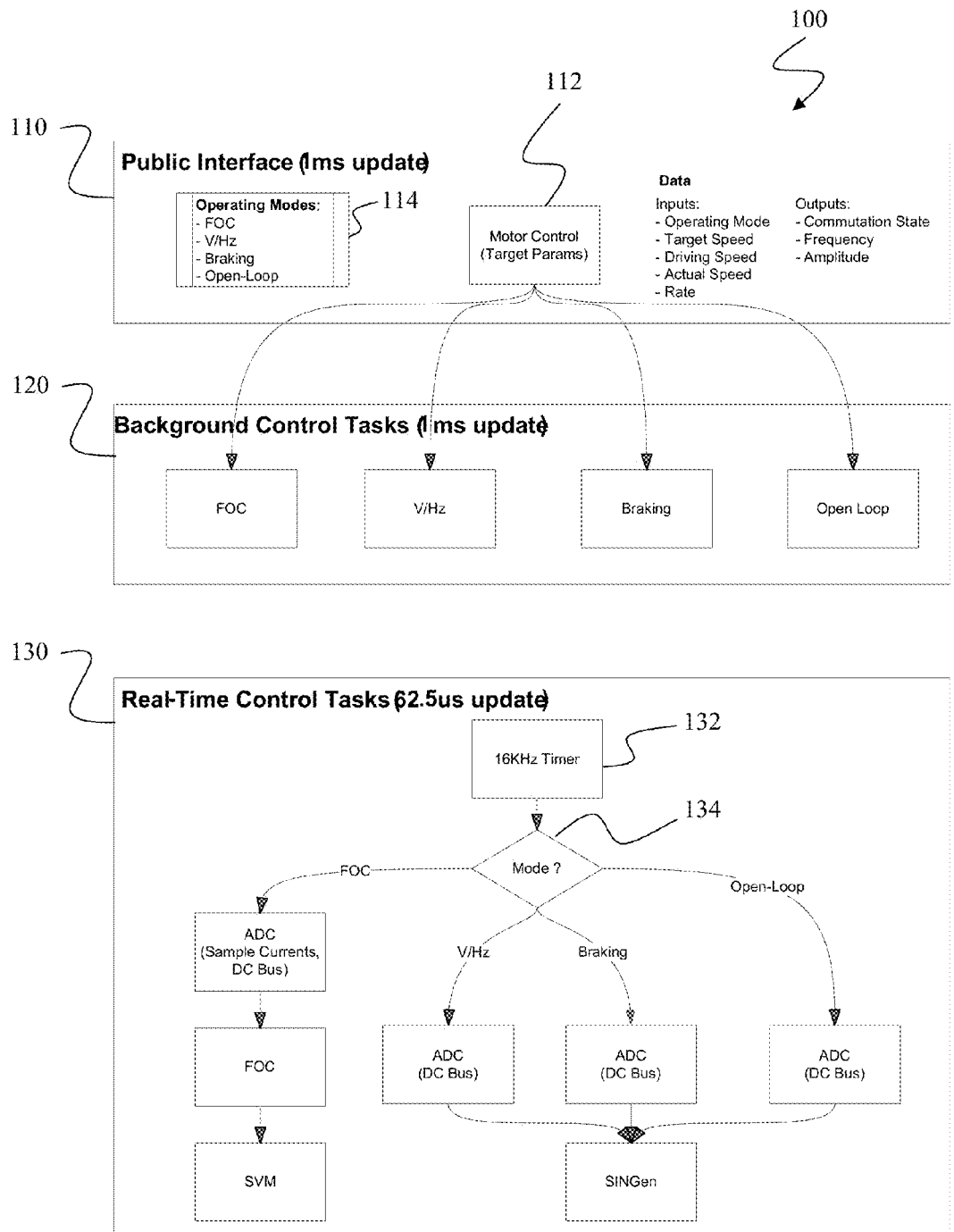
FIG. 1 provides an overview of an exemplary washing machine motor control scheme in accordance with present technology.

Repeat use of reference characters throughout the present specification and appended drawings is intended to represent same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As noted in the Summary section, the present subject matter is directed to methodologies for providing washing machine motor control using selectable control algorithms. With reference to FIG. 1, chart 100 illustrates an overview of an exemplary washing machine motor control scheme in accordance with present technology. Chart 100 representatively illustrates a number of motor controlling aspects that, in certain instances, may be provided by way of software or firmware operating on a computer, processor, or microprocessor. Alternative devices for providing these operations may, of course, also be provided including, without limitation, such as application specific integrated circuits (ASIC), and customized printed circuit boards and combinations of all of these including the previously mentioned computer, processor, and microprocessor.

As presently illustrated in exemplary form, public interface 110 provides basic direction of operation for motor control 112 by setting various operational modes 114 including selection of Field-Oriented or V/Hz motor control as well as other operational modes including braking and open-loop control. Selected data may be provided to public interface 110 including, without limitation, Operating Mode, Target Speed, Driving Speed, Actual Speed, and Rate. In addition, various outputs may be provided from public interface 110 including, without limitation, Commutation Status, Frequency, and Amplitude. Background control tasks 120 are provided to control various motor operations and functions including FOC, V/Hz, Braking, and Open Loop operation. For example, during FOC operation the slower speed control loop would be executed in the Background block with a 1 ms update rate.

As further illustrated in FIG. 1, real-time control tasks 130 are controlled under the direction of timer 132 that, in an exemplary configuration may correspond to a device incorporating a 16 KHz clock. Such exemplary clock speed will result in updating of the real time control tasks each 62.5 µs. Those of ordinary skill in the art will appreciate that other clock speeds may be established. Mode selection 134 as established by operational mode 114 from public interface 110 then determine under which of the several modes, i.e., FOC, V/Hz, Braking, and Open-Loop, the washing machine motor will be directed to operate.

In accordance with present technology, the basic idea is to switch motor control algorithms for a washing machine motor to achieve different, sometimes mutually exclusive, performance and efficiency requirements based on the needs of the system. By implementing the present technology, there is provided an efficient washer motor operation that can also switch to a high-power mode to achieve very high spin speeds.

Figure 2:
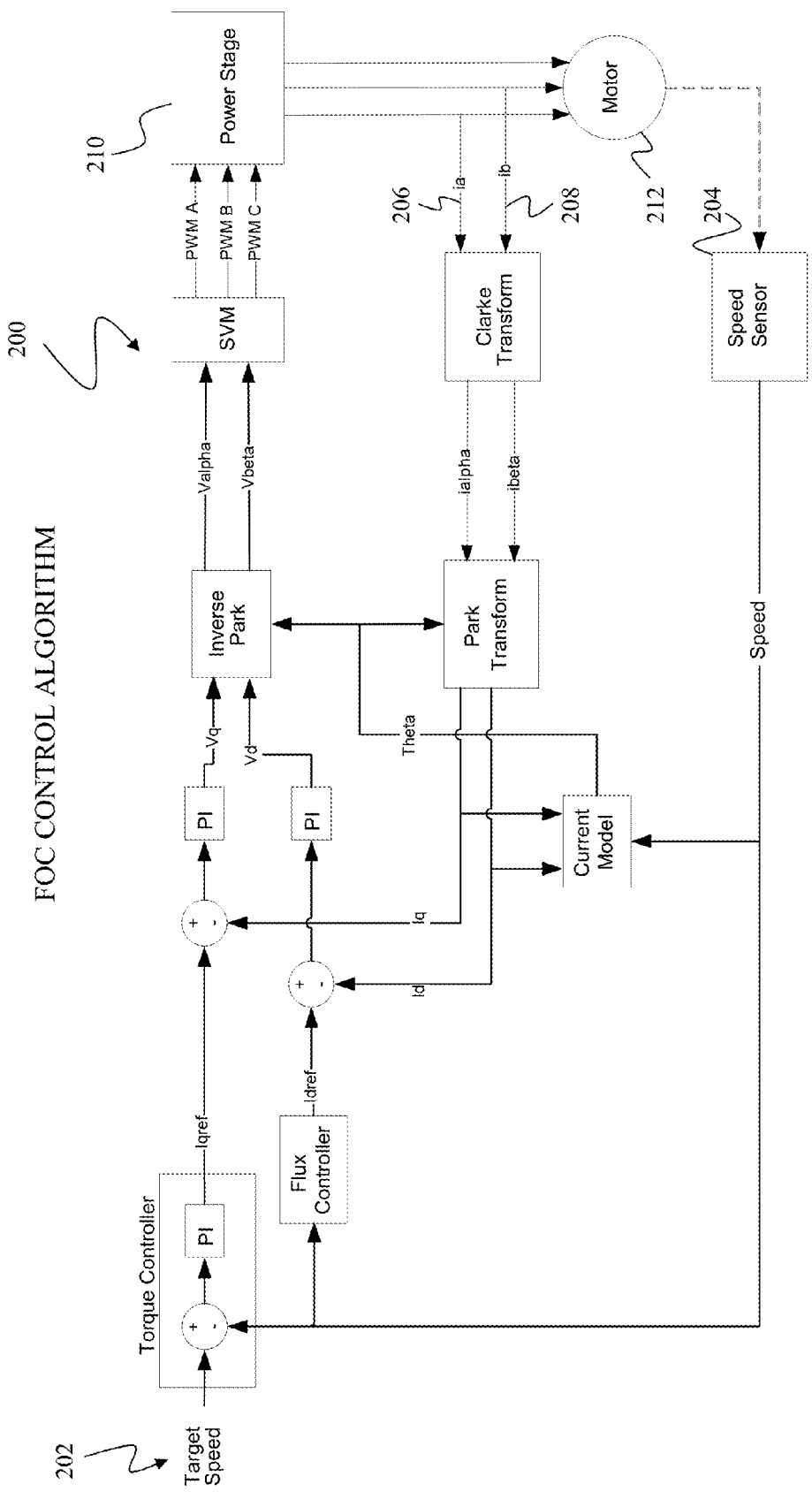
FIG. 2 is a schematic representation of an exemplary Field-Oriented Control (FOC) algorithm that may be employed with the present subject matter to control an AC induction motor.
Figure 3:
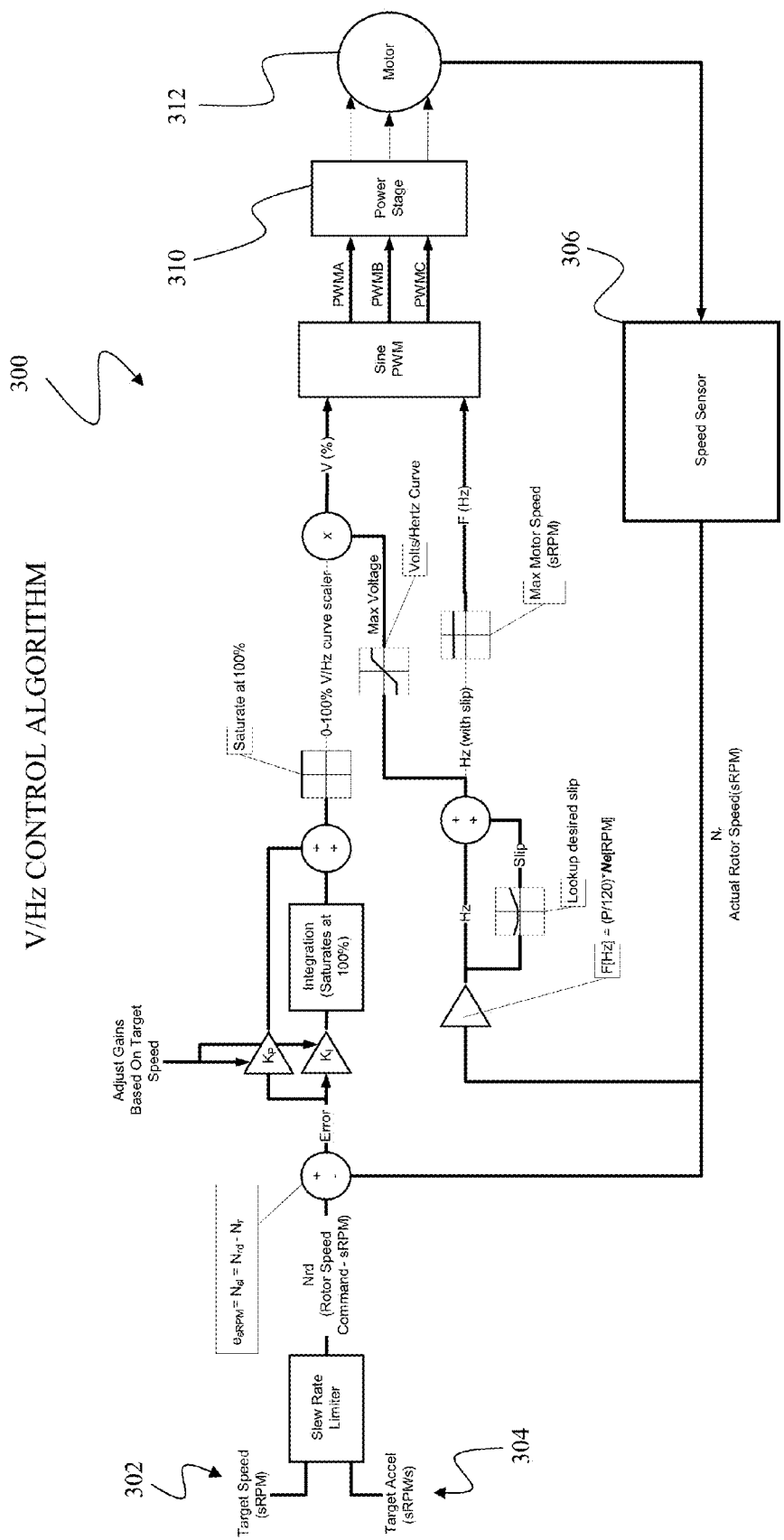
FIG. 3 is a schematic representation of an exemplary V/Hz control algorithm that may be employed with the present subject matter to control an AC induction motor.

With brief reference to FIGS. 2 and 3, there are illustrated schematic representations of exemplary Field-Oriented Control (FOC) algorithm 200 and V/Hz algorithm 300 that may be employed with the present subject matter for an AC induction motor. Slight modifications to these control algorithms may be required for different motor types such as permanent magnet or brushless DC (BLDC) motors. The FOC algorithm 200 of FIG. 2 includes an input Target Speed 202 while variables including motor speed from Speed Sensor 204 and current signals on lines 206, 208 are also provided to the algorithm that then generates pulse width modulated signals for application to power stage 210 to control motor 212. Those of ordinary skill in the art will appreciate that the illustrated FOC algorithm 200 employs known signal processing techniques including the use of Park and Clarke Transforms to simplify signal processing. The particular FOC algorithm 200 illustrated is, however, exemplary of a number of such algorithms that may be employed with the present subject matter. The present only requirement is that the algorithm provide FOC control.

Similarly, with respect to FIG. 3 there is illustrated an exemplary V/Hz control algorithm 300 that receives as inputs target speed 302 and target acceleration 304 signals and also monitors motor speed via speed sensor 306 but does not monitor motor current as did FOC control algorithm 200. V/Hz control algorithm 300 does, however, also provide pulse width modulated signals for application to power stage 310 to control motor 312 in similar fashion to FOC control algorithm 200. Again, the particular V/Hz algorithm 300 illustrated is exemplary of a number of such algorithms that may be employed with the present subject matter. The present only requirement is that the algorithm provide V/Hz control.

In accordance with present technology, a method has been provided to permit switching between FOC and V/Hz control algorithms 200, 300 while motor 212, 312 is spinning. The present technology then is able to provide operation at low speeds using FOC for its great torque response and efficiency and at high speeds, V/Hz may be used to ensure the washing machine basket reaches max spin speed. Other control algorithms as previously mentioned, including such as Open-Loop, Braking, etc, may also be "switched to" based on various needs.

Further in accordance with present technology, when switching among the various control algorithms, the following steps are followed. First, when using AC induction motors, currents to motor 212, 312 are dropped long enough for the rotating magnetic field in the motor to subside. This step may not be required for PMSM/BLDC type motors. In an exemplary configuration this time period may correspond to about 200 ms for typical washer AC induction motors. Failure to perform this step for AC induction motors may result in significant occurrence of transient currents that may cause current faults, or other detrimental issues. As previously noted, this step may be eliminated for synchronous motors (PMSM/BLDC motors) where an accurate rotor position is known so that control signals can be properly synchronized when starting the new control algorithm. Further, the present methodology provides for initializing all control algorithm parameters so that the control algorithm will smoothly ramp to the necessary levels to maintain the current operating speed. Such a smooth ramp-up operation provides for "soft starting" of the motor.

Figure 4:
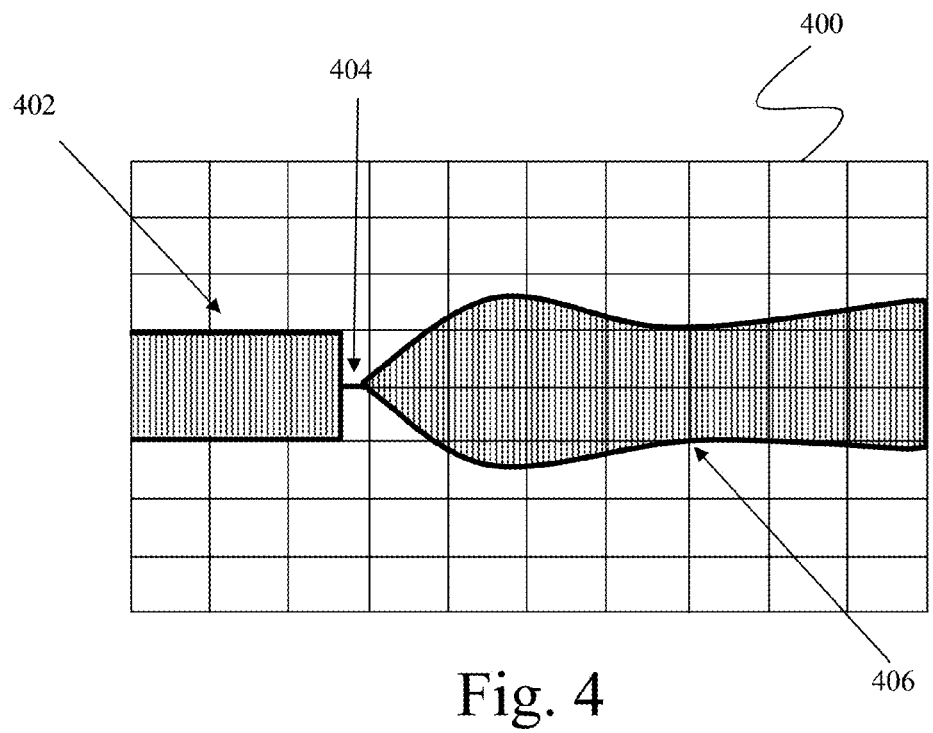
FIG. 4 is a graphical representation of an exemplary motor phase current waveform illustrating transition from FOC control to V/Hz control in an AC induction motor.
Figure 5:
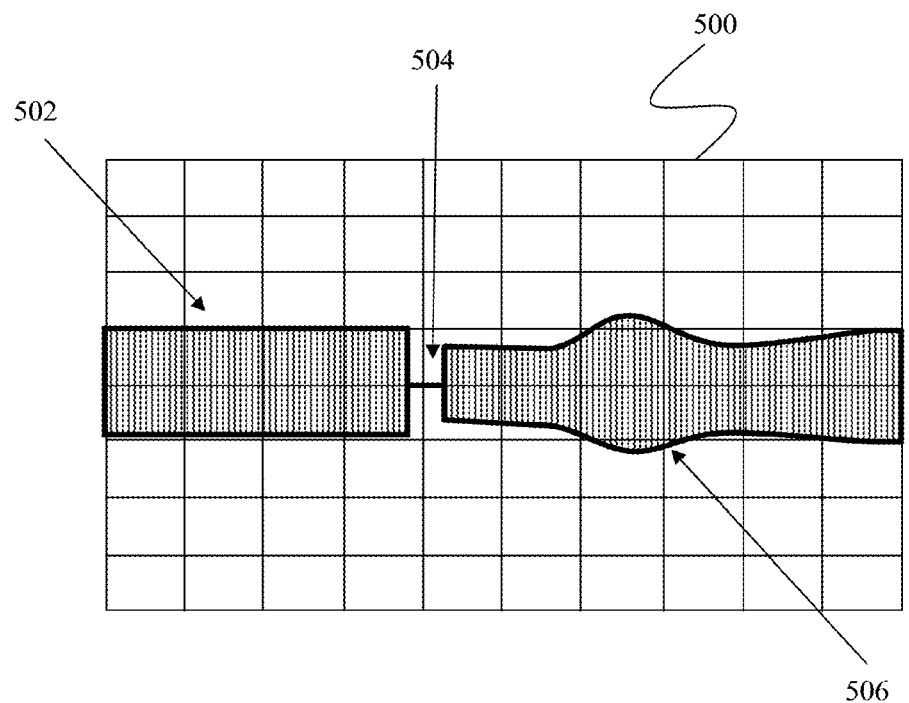
FIG. 5 is a graphical representation of an exemplary motor phase current waveform illustrating transition from V/Hz control to FOC control in an AC induction motor.

With reference now to FIGS. 4 and 5, there are illustrated graphical representations of representative motor phase current waveforms illustrating transition from FOC control to V/Hz control in FIG. 4 and transition from V/Hz control to FOC control in FIG. 5 in accordance with present disclosure. In exemplary configuration, motor 212, 312 may be spinning at about 6350 RPM before, during, and after the transitions between the FOC and the V/Hz control algorithms in both the FIGS. 4 and 5 configurations.

As may be seen in FIG. 4, an exemplary phase current graph 400 shows transition from FOC algorithm control in area 402 to V/Hz control in area 406. A relatively short period in area 404 is provided where current from power stages 210, 310 is discontinued prior to the transition from FOC control to V/Hz control for AC induction motors.

With reference to FIG. 5, an exemplary phase current graph 500 shows transition from to V/Hz control in area 502 to FOC algorithm control in area 506. Again, a relatively short period in area 504 is provided where current from power stages 210, 310 is discontinued prior to the transition from V/Hz control to FOC control for AC induction motors.

As previously noted, transitions to other control algorithms including to a Braking algorithm or Open-Loop algorithm may also be accommodated using the present technology where a transition time between implementation of control algorithms is provided to permit enough time for the rotating magnetic field in the motor to subside if the particular motor employed, e.g., PMSM/BLDC motors or other types, requires this step.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing washing machine motor control, comprising:
controlling operation of a washing machine motor using a field-oriented control algorithm to perform washing machine operations in which torque response is controlled;
controlling operation of the washing machine motor using a voltage-frequency control algorithm to perform washing machine operations in which high power and spin speed are controlled;
changing from operation using the field-oriented control algorithm to operation using the voltage-frequency control algorithm while the washing machine motor is spinning; and
discontinuing application of motor operating energy to the motor for a predetermined transition period of time following discontinuance of operation using the field-oriented control algorithm and prior to starting operation of the washing machine motor using the voltage-frequency control algorithm;
wherein the motor continues to spin during the transition period; and
wherein the transition period is of such duration as to permit rotating magnetic fields in the motor sufficient time to subside such that the rotating magnetic fields do not induce transient currents upon starting operation of the washing machine motor using the voltage-frequency control algorithm.

2. A method as in claim 1, wherein the voltage-frequency control algorithm is configured to provide a soft-start of the motor.

3. A method as in claim 1, wherein the predetermined transition period is at least about two hundred milliseconds.

4. A washing machine motor control, comprising:
a controller configured to provide operational control of a washing machine motor by performing operations comprising:
operating the washing machine motor during agitation operation using a field-oriented control algorithm; and
operating the washing machine motor during spin operation using a voltage-frequency control algorithm;
wherein the controller is further configured to change operational control from operation using the field-oriented control algorithm to operation using the voltage-frequency control algorithm while the washing machine motor is spinning; and
a timer configured to delay application of motor operating energy to the motor for a predetermined transition time following discontinuance of operation using the field-oriented control algorithm and prior to starting operation of the washing machine motor using the voltage-frequency control algorithm;
wherein the motor continues to spin during the predetermined transition time; and
wherein the predetermined transition time is of such duration as to permit rotating magnetic fields in the motor sufficient time to subside such that the rotating magnetic fields do not induce transient currents upon starting operation of the washing machine motor using the voltage-frequency control algorithm.

5. A washing machine motor control as in claim 4, wherein the voltage-frequency control algorithm is configured to provide a soft-start of the motor.

6. A washing machine control as in claim 4, wherein the predetermined transition period is at least about two hundred milliseconds.

7. A method for providing washing machine motor control, comprising:
controlling operation of a washing machine motor during agitation operation using a field-oriented control algorithm;
changing from operation using the field-oriented control algorithm to operation using a voltage-frequency control algorithm while the washing machine motor is spinning; and
controlling operation of the washing machine motor during spin operation using the voltage-frequency control algorithm;
wherein changing from operation using the field-oriented control algorithm to operation using the voltage-frequency control algorithm comprises discontinuing application of motor operating energy to the motor for a predetermined transition period of time following operation using the field-oriented control algorithm and prior to operation using the voltage-frequency control algorithm, the predetermined transition period of time being of such duration as to allow current to the motor to be discontinued.

8. A method as in claim 7, wherein the predetermined transition period is at least about two hundred milliseconds.

9. A method as in claim 7, wherein the voltage-frequency control algorithm is configured to provide a soft-start of the motor.

\* \* \* \* \*